United States Patent
Soliman et al.

(10) Patent No.: US 8,667,156 B2
(45) Date of Patent: Mar. 4, 2014

(54) APPLICATION-INDEPENDENT SERVICE DELIVERY

(75) Inventors: Hesham Soliman, Melbourne (AU); Gregory Ian Daley, Melbourne (AU)

(73) Assignee: Elevate Technologies Pty Ltd., Melbourne (AU)

(*) Notice: Subject to any disclaimer, the term of this patent is extended or adjusted under 35 U.S.C. 154(b) by 653 days.

(21) Appl. No.: 12/110,471

(22) Filed: Apr. 28, 2008

(65) Prior Publication Data

US 2008/0275995 A1    Nov. 6, 2008

Related U.S. Application Data

(60) Provisional application No. 60/915,509, filed on May 2, 2007.

(51) Int. Cl.
    *G06F 15/16* (2006.01)
(52) U.S. Cl.
    USPC .................................. 709/230; 709/229
(58) Field of Classification Search
    USPC .................................. 709/230, 229
    See application file for complete search history.

(56) References Cited

U.S. PATENT DOCUMENTS

| | | | |
|---|---|---|---|
| 6,883,019 B1 | 4/2005 | Sengupta et al. | |
| 7,252,636 B2 * | 8/2007 | Brown | 600/300 |
| 2002/0124067 A1 | 9/2002 | Parupudi et al. | |
| 2004/0054760 A1 * | 3/2004 | Ewing et al. | 709/219 |
| 2004/0259534 A1 | 12/2004 | Chaudhari et al. | |
| 2007/0027920 A1 | 2/2007 | Alvarado et al. | |
| 2007/0027975 A1 * | 2/2007 | Tai et al. | 709/223 |
| 2007/0150480 A1 * | 6/2007 | Hwang et al. | 707/10 |
| 2008/0228864 A1 * | 9/2008 | Plamondon | 709/203 |

OTHER PUBLICATIONS

International Search Report dated Sep. 11, 2008 (Four (4) pages).
PCT/ISA/237 dated Sep. 11, 2008 Six (6) pages.

* cited by examiner

*Primary Examiner* — David X Yi
(74) *Attorney, Agent, or Firm* — Crowell & Moring LLP

(57) ABSTRACT

A service delivery platform that can support a number of different services is provided. A context regarding an application device is received by the service delivery platform. Applications executed on the service delivery platform use the context to optimize the delivery of information to application devices.

19 Claims, 4 Drawing Sheets

APPLICATION-INDEPENDENT SERVICE DELIVERY

The present application claims priority under 35 U.S.C. §119 to U.S. Provisional Patent Application No. 60/915,509, filed May 2, 2007, the entire contents of which is herein expressly incorporated by reference.

BACKGROUND OF THE INVENTION

Wide-area wireless communication networks, commonly referred to as cellular networks, have been deployed for some time. As these networks have advanced from analog transmissions to digital transmissions the available capacity has greatly increased. This increased capacity has allowed wide-area wireless communication network service providers to offer various types of non-voice services. In order to maintain a steady revenue stream, these service providers typically maintain very tight control over the types of services offered to subscribers of their networks. Thus, there have been very limited non-voice services offered by these service providers.

SUMMARY OF THE INVENTION

One technique for accessing a greater variety of services is to use a wireless communication service provider's handset as a data terminal to access applications over the Internet. However, until relatively recently, wide-area wireless communication network service providers charged exorbitant per megabyte fees for communicating data over their networks. Accordingly, there has been very little development in offering services that are not tied to a particular service provider, over the service provider's network.

Exemplary embodiments of the present invention are directed to addressing the above-identified and other deficiencies of conventional techniques by providing a service delivery platform that can support a number of different services. Each service is provided by an application that is executed on the platform, and thus the present invention provides a single platform to deliver a number of different services in an application-independent manner. This contrasts with services offered by wide-area wireless network service providers, which typically employ a different platform for each application.

Other objects, advantages and novel features of the present invention will become apparent from the following detailed description of the invention when considered in conjunction with the accompanying drawings.

BRIEF DESCRIPTION OF THE DRAWING FIGURES

DETAILED DESCRIPTION OF THE PREFERRED EMBODIMENTS

Exemplary embodiments of the present invention provide a service platform architecture designed for optimal delivery of services in a wireless Internet deployment by combining diverse knowledge about different aspects of a connection in order to provide the application with the right context for optimal content delivery. The context can be based on information, such as the device type, user's profile, device location, etc. The present invention employs the context for selection and optimization of the content sent to a device, as well as to inform the wireless device of the best methods for sending its information.

Exemplary services that can be employed with the present invention include telemedicine services, wellness services, financial services, gaming, sensor networks, etc. Telemedicine services can involve the remote monitoring of patient's health using a medical device (i.e., an application device) that tracks the relevant body functions and a transmission device (i.e., an Internet Gateway) that receives medical information and sends it to a remote location. Telemedicine can also involve remote monitoring of heart patients, SMS services used as reminders for patients' appointments (SMS PR) and the use of paging systems to inform patients of their turn to see a physician. Because the nature of the data generated, and its frequency, may depend largely on the type of device used, the context information can be employed to optimize the service. Furthermore, the context information can be used to optimize the type of wireless link being used at any particular time in order to influence the performance of the application, which may impact an emergency situation. Based upon certain conditions, the remote monitoring device can trigger a phone call to a nurse, physician, an ambulance, family members and/or friends in case of emergencies. The information transmitted with the call can include medical information or other information about a patient's diet and other medical conditions that are not being monitored to give a holistic medical record.

A "Wellness" service involves (but is not limited to) the monitoring and storage of personal and body functions information about a person who is not a patient. Such service might be used for general well-being, to monitor important body functions and parameters (e.g. weight, blood pressure, heart rate), or it can be used by athletes and sports enthusiasts to keep a record of their training, performance and their bodies' reactions during a training session or competition.

Figure 1:
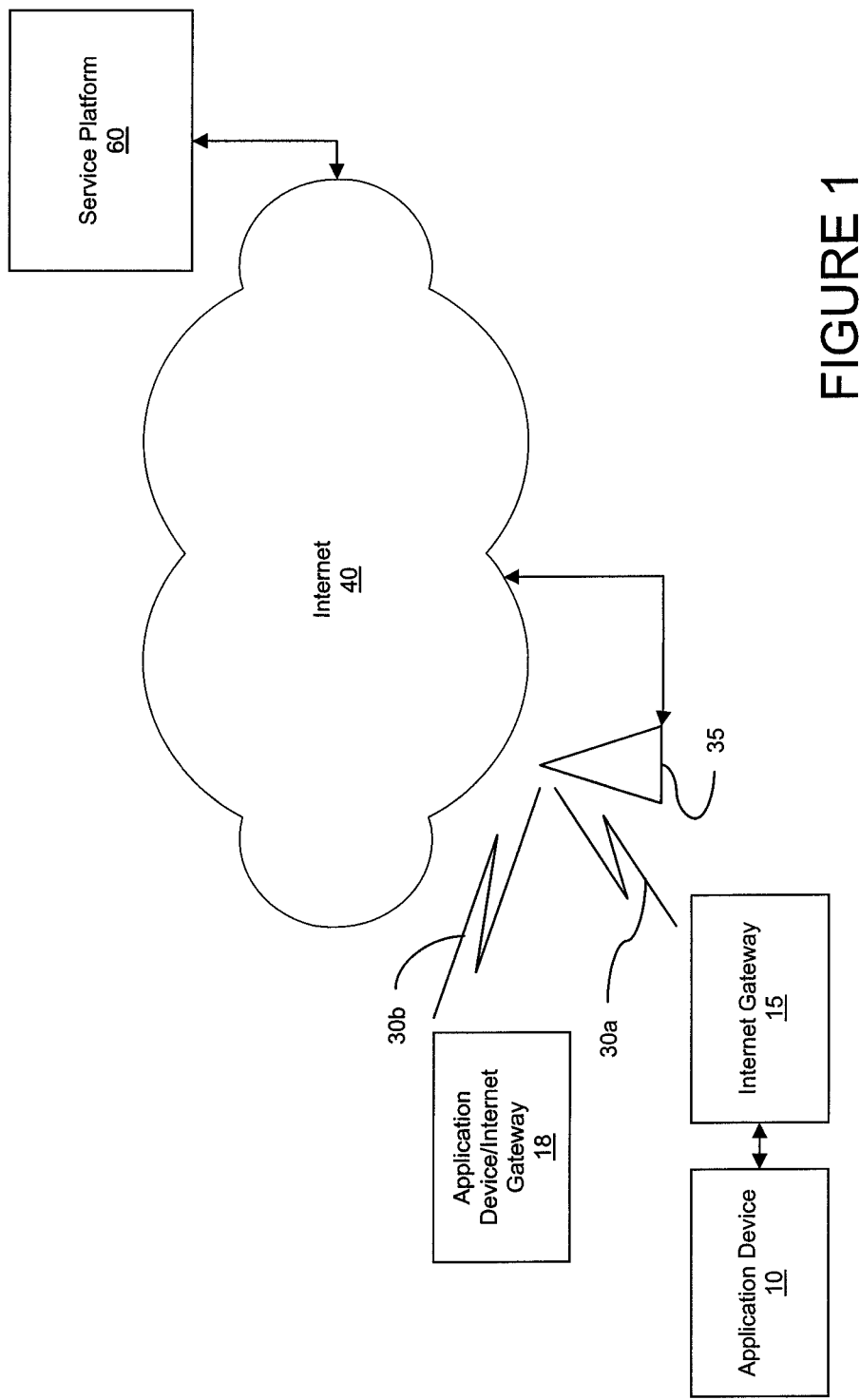
FIG. 1 is a block diagram of an exemplary system in accordance with the present invention.

Referring now to FIG. 1, an exemplary system includes an application device 10 coupled to Internet 40 by way of an Internet gateway 15.

Application device 10 can be, for example, a medical device or other type of remote monitoring device, and Internet Gateway 15 can be, for example, a mobile telephone that uses wireless link 30a to communicate with base station 35. Internet gateway 15, however, is not limited to a wireless device, and can be a wired device. Accordingly, Internet Gateway 15 can have a wired and/or wireless link to Internet 40. Although FIG. 1 illustrates a single application device being coupled to Internet Gateway, the present invention can also employ more than one application device being coupled to the Internet Gateway.

As illustrated in FIG. 1, the functionality of application device 10 and Internet Gateway 15 can be combined into a single device 18, e.g., a mobile computer, which uses wireless link 30b to communicate with base station 35. Devices 10, 15 and 18 communicate with a service platform 60 through Internet 40 in order to provide services to an end-user. Service platform 60 executes a plurality of applications to provide services to end-users via applications devices. In the following description devices 10, 15 and 18 are collectively referred to as the remote device.

Figure 2:
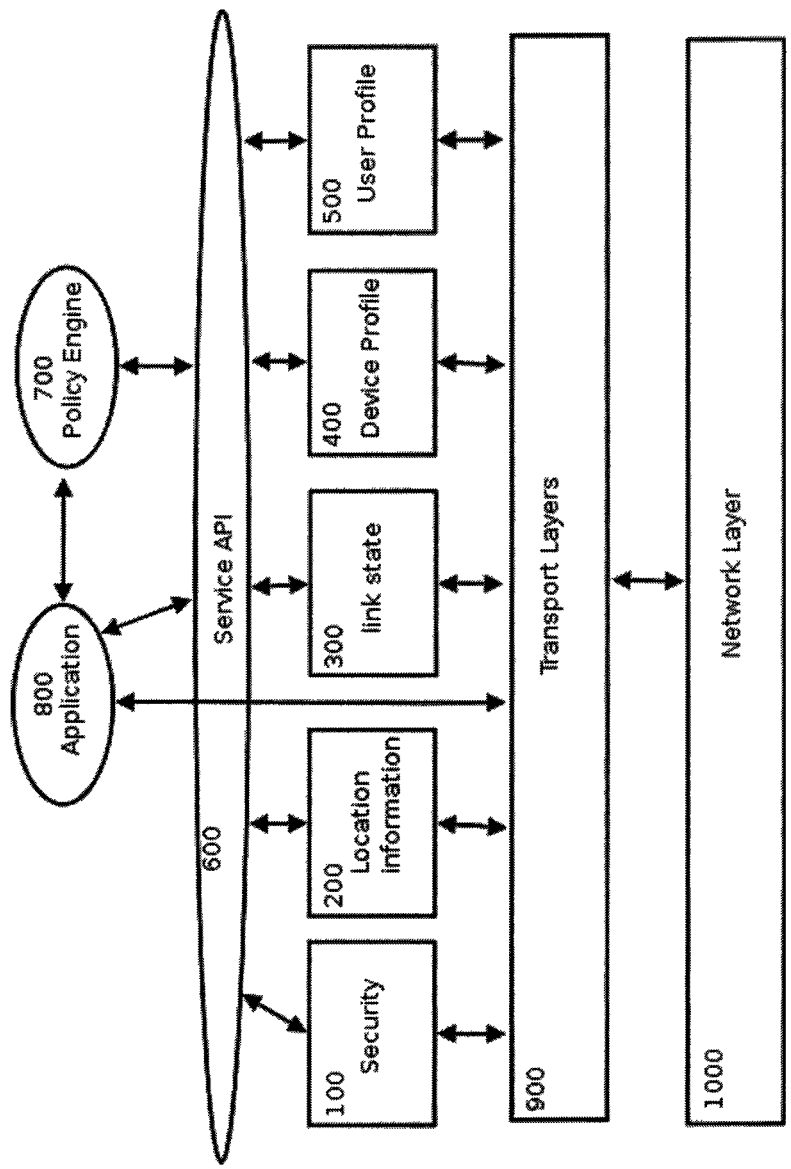
FIG. 2 is a block diagram of an exemplary service platform in accordance with the present invention.

FIG. 2 is a block diagram of an exemplary service platform 60 in accordance with the present invention. The arrows in FIG. 2 indicate bi-directional communication between the modules. The service platform includes a network layer 1000, coupled to transport layers 900. Transport layers 900 are coupled to security module 100, location information module 200, link state module 300, device profile module 400, user profile module 500 and application 800. Each of these modules is coupled to a service application program interface 600, which is in turn coupled to policy engine 700 and application 800.

Network layer 1000, which can be, for example, an Internet Protocol (IP) layer, handles routing of incoming and outgoing packets between the applications and the remote application device. The network layer can utilize IPv4 or IPv6 or other non-Internet network layers. Alternatively, the network layer may be absent, in which case the applications and other modules can run directly on top of the link layer. In such scenario, routing can be accomplished using the link layer.

Transport layers 900 include the transport layer (e.g. transmission control protocol (TCP), user datagram protocol (UDP), or stream control transmission protocol (SCTP)) that are used to generically control the transmission of data by applications. These layers have general transmission rules associated with reliability and error checks among other parameters, which are not necessarily customized for each application. Thus, combinations of data reliability and retransmission mechanisms can be used, which adapt to the wireless connectivity of Internet Gateway 15.

Security module 100 handles authentication and authorization of a particular user, application device and/or Internet Gateway. The authentication and authorization process may rely on pre-configured credentials in the service platform, or credentials downloaded from another server. The latter case is particularly suited to cellular networks like GSM, UMTS and cdma2000 networks where pre-configured security credentials exist between the user (stored on the phone or a Subscriber Identity Module, SIM, card) and a server in the operator's network. Examples of such servers are the Home Location Register (HLR) in GSM networks, or the HSS in UMTS networks, which includes an AAA server. In the absence of pre-configured credentials, security module 100 leverages Public Key operations to generate a security association between the user's device and the applications running on the service platform 60.

The result of a successful authentication and authorization process is the generation of authentication and encryption keys that are used to allow an application running on the service platform to communicate securely with the remote device (e.g., the Internet Gateway relaying the medical device's information) for a period of time. The security module's operations typically take place before the applications start transmitting their information. Those operations are repeated just before, or after, the existing security association times out, or when prompted by the service delivery platform.

Location information module 200 receives a remote device's geographic and topological information and updates the application with such information. The frequency of the reception of such information can be configured on the service platform and communicated to the remote device when communication is first established. Depending on the service, the location of the user can be extremely important. In an emergency, it is important to be able to locate a user in an accurate manner. Even in non-medical applications, the location of a user can be important and can be used to optimize the information being delivered. A simple example is a user looking for a particular office or a shop within walking distance.

The location information can include, for example, parameters regarding the type of positioning system, geographic coordinates of the application device, tolerance of the geographic coordinates and the topological location. It should be recognized that other information can be used in addition to, or as an alternative to, the aforementioned information.

The type of the positioning system parameter indicates to the service platform which positioning system is being used. Several systems may be used, such as the Global Positioning System (GPS), Assisted GPS (AGPS), the European Galileo positioning system, GSM-based triangulation mechanisms and/or the like. The geographic coordinates of the device parameter can be generated with a global positioning system like the Global Positioning System (GPS), or others. The tolerance of the geographic co-ordinates parameter provides information on the accuracy of the positioning system.

The topological location parameter includes the device's topological location. For instance, it may include, at least, the IP address of the gateway that the device is connected to, the device's IP address, the Domain name suffix of the network, or other information about the local domain that may be obtained from the local AAA system (e.g. the realm of the Network Address Identifier of a local AAA server). The device's IP address sent in this parameter may be different from the IP address seen by the application due to the presence of a Network Address Translator (NAT). Therefore, knowing both addresses allows the location information module to better determine the topological location of the device.

The combination of the topological information with less accurate positioning systems can give the service platform a better idea about the location of the device. This can also act as a redundant location system when other systems (e.g. GPS) are not available due to the device's location, such as when the device is indoors or shadowed from a satellite system by other objects.

The location information module correlates all of the information provided by the device in order to allow the application to determine how to send information to such device. The content sent to or from the application on the service platform may vary depending on the location of the remote device. Upon reception of the location information, the location information module passes this information to the policy engine module 700. This process is repeated whenever new location information is sent.

Link state module 300 determines information related to the dynamics of the link between the remote device and the service platform. The link between those two communicating nodes can span many hops across the Internet. This module emulates the entire path as a single link and determines the characteristics of such link based on dynamic and static information determined from the traffic's throughput, delay and information sent from the remote device about the type, quality and cost of the link it is attached to.

The information gathered by link state module 300 can include the type of link, path throughput, path goodput, and path variation. It should be recognized that other information can be used in addition to, or as an alternative to, the aforementioned information.

The type of link that connects the remote device to the Internet is sent from the remote device, and can specify the link type as, for example, WCDMA, CDMA, GSM, IEEE802.11a/b/g or Ethernet, etc. It can also include more granular information about the link like a Bearer definition (as defined in 3GPP and 3GPP2 standards), which includes the available bandwidth, reliability and a cost metric. This information is dynamic and can change with a change in the access network or the conditions associated with a particular access network.

The path throughput parameter is calculated based on the round trip time for the traffic between the application and the remote device and the amount of data transmitted in bytes. The path goodput parameter is calculated based on the throughput of valid packets between the service platform and the remote device. A valid packet is a received packet that contains no transmission errors. The path variation parameter accounts for movement or environmental effects of the communication path that may affect Internet gateway's operation. The device mobility, handover service restoration times, and variation in the path delay, and jitter may be used to modify encoding, queuing and retransmission strategies.

The information gathered by link state module 300 is passed to the policy engine module 700, and may also be passed to the application module 800. The information above is calculated dynamically throughout the lifetime of an active connection, i.e., while data is being transmitted and received by both ends. The parameters above are calculated over a significant period of time that can be configured by the service platform's administrator. For instance, a period of 10 seconds may be used to calculate the above parameters.

Link state module 300 also updates policy engine 700 (and optionally application module 800) if a significant change in the above parameter has taken place. This is done to adapt the application to changes in the path.

Device profile module 400 receives the profile of the application device 10 and/or Internet Gateway 15. The profile contains the device's processing capacity, storage capacity, display type (including the screen type, resolution and size), power capacity (when fully charged as well as the current power availability), link layers supported by the device and whether they are enabled and the types of applications supports. This information is used to determine the format of the information sent to the remote device, the size, and the compression mechanism for the information.

User profile module 500 includes configuration parameters for the user. This includes static preferences specific to the service platform, including application-specific configurations. In some scenarios, this information can be updated by the user in a secure manner. The user profile can be preconfigured by the operator or the application vendor with a number of default settings and/or configured by the user or application deployer when signing up for a service. The user profile is divided into two main categories of information: 1) generic information available to all applications and 2) application-specific information.

The generic information can include parameters such as user information, payment method, applications, preferred language, location privacy, application privacy, security level, location names, application behavior based on location and roaming requirements. It should be recognized that other information can be used in addition to, or as an alternative to, the aforementioned information.

The user information includes a number of items that identify the user, like, name, address, age. The payment method includes account information for billing purposes. The applications parameter is a list of the number and names of applications that the user is using on a given service platform. The preferred language parameter indicates the user's preferred language.

The location privacy parameter is set by the user to indicate whether the user's location should be disclosed to other parties or whether location information should be turned off completely. The application privacy parameter is set by the user to indicate whether the applications being used should be disclosed to third parties, who is authorized to know which applications are in use, or whether this information is completely unavailable. The security level parameter allows the user to indicate what level of security is needed and associate such security with certain geographic or topological locations.

The location names parameter allows the user to indicate whether certain locations have specific properties that can help optimize the delivery of application information. For instance, a user can indicate that certain locations (topological or geographical) offer inexpensive or free access, or secure access. Furthermore, based on such associations, the user can be known to be at home, work, and so on.

The application behavior based on location parameter allows the user to associate a particular application behavior that should be followed based on his or her location. For instance, the user may want to abort an application when located in the office. The roaming requirements parameter allows the user to indicate specific behaviors when roaming to other networks. For instance, a user may disable the reception of any information when roaming.

Application-specific information of the user profile depends on the application being used and may be configured by the service provider and/or the user.

Service API module 600 contains the Application Programming Interface (API) needed to allow different modules to communicate with one another or with the application. The Service API allows for bi-directional communication that can be initiated by any module.

Policy engine module 700 receives inputs from modules 100, 200, 300, 400, 800 and 500. As a result, this module has knowledge of all aspects of the communication for a particular connection between an application on the service platform and a remote device. Information passed from all modules to the policy engine is tagged with a unique connection identifier that is used to distinguish the characteristics of one connection from another, regardless of the identity of the user.

Policy engine 700 creates an application connection context based on the information received from the other modules. The application connection context is a set of attributes that describe how a particular connection for an application will be managed, as well as a format of the information exchanged over the connection. Such attributes can include security, throughput, location and data format. It should be recognized that other information can be used in addition to, or as an alternative to, the aforementioned information.

The context information allows the platform to support a number of different application services. In contrast, prior platforms that were designed to support a single service have limited knowledge of the device capabilities, and typically the only type of adaptation of content is the use of one of a number of different transcoders that can be used to adapt content to such capabilities. The context information of the present invention provides much more information that allows different applications to deliver content associated with a service. Specifically, by combining a wide range of sets of information and compiling it in a manner that makes it useful for the application and allows it to optimally deliver content.

The context information of the present invention can also account for the fact that certain applications may require different treatment for emergency situations, whereas in other scenarios the same applications may be treated as "best-effort" and become more tolerant to delays. Hence, more optimal bandwidth utilization can be achieved based on the time of use, the application being used and the user settings.

The security attribute provides information on whether a connection is to be encrypted, authenticated, protected against replay attacks and so on. It also specifies the algorithms and lifetime values that should be used for securing a connection. This attribute is deduced based on the administrator's configured policies and the user's profile.

The throughput attribute is mainly based on the information provided by link state module 300. It defines the amount of bandwidth available for the connection. As a result, this parameter is combined with the knowledge gained from the device profile module 400 to find a suitable encoding/compression mechanism. This attribute is also used to adapt the flow control mechanisms in the application on a per-connection basis.

The location attribute is deduced from the location information module 200. The combination of geographic and topological locations and the user profile can provide more information than the physical location to the application. Such combination can be used to associate the physical location with a name registered in the user profile. Based on such information the application may be aware that the user is at home, work and so on. The location information is used to adapt the content delivered from the application. An application may decide that some of the content is irrelevant when the receiver is in a particular location.

The data format attribute is based on the device profile, user profile and the link state information. This attribute allows the application to decide on the data encoding used to send data. Depending on the link state, different encoding mechanisms may be used to save bandwidth or battery power of the Internet Gateway. This attribute also contains information for supported file types and applications to allow the sending of data in the relevant format for the receiver. For instance, if a file is sent, the application needs to ensure that it is sent in a format that allows the receiving device to display or use such file. This is determined based on the device capabilities.

Application module 800 contains the application that provides the content being transmitted between an end device and the application located on the service platform. Many different applications can be run on the service platform, such as gaming, financial, health monitoring or general remote monitoring applications for sensor networks, or automobiles.

Figure 3:
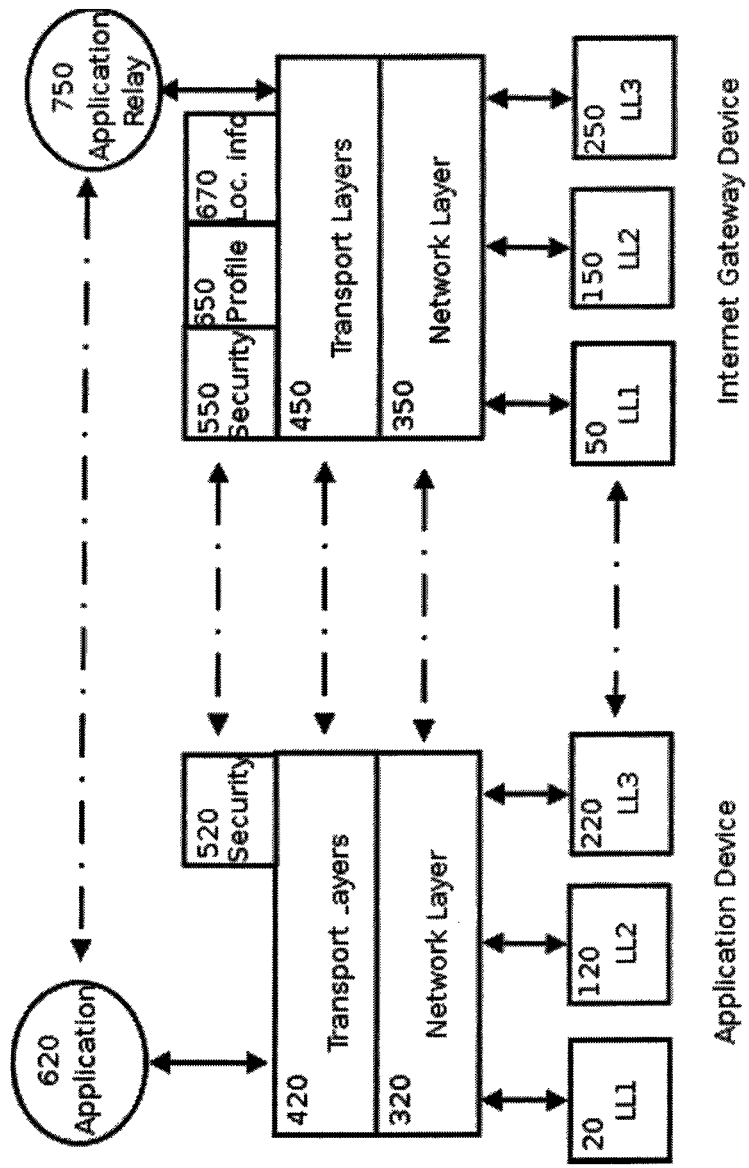
FIG. 3 is a block diagram of an exemplary Internet gateway and application device in accordance with the present invention.

FIG. 3 is a block diagram of an exemplary Internet gateway and application device in accordance with the present invention. In this section the functional breakdown of the Internet gateway 15 and the application device 10 is illustrated.

Link layer (LL) modules 50, 150, 250, 20, 120 and 220 are examples of different link layers in a device. A device can have one or more physical interfaces that are managed by link layer drivers. Each one of the link layer modules in FIG. 3 represents a different physical communication medium. If the Internet Gateway and the application device are in two separate physical devices, they need to communicate through a physical communication medium. Only one physical may be used to communicate, however a number of different links are shown in FIG. 3 as examples.

Network Layer modules 350 and 320 in both devices are the same as module 1000 in FIG. 2. Transport layer modules 450 and 420 in both devices are the same as module 900 in FIG. 2.

Security module 550 establishes the secure communication channel between the Internet Gateway and the Service Platform shown in FIGS. 1 and 2. This module retrieves the user's credentials, and using a secure handshake protocol, can communicate with the service platform in order to authenticate and authorize the user for access to services managed by the service platform. The user credentials may be stored inside non-volatile memory on the Internet Gateway, in a removable module (e.g. SIM), or entered by the user at the time of connection. Security module 550 also establishes secure communication with the application device 10, and may coordinate with the application security module 520. This is especially important for cases where the application device is physically separate from the Internet Gateway. Securing such communication may be based on preconfigured credentials on both devices. Alternatively, security credentials may be entered by the user at the time of connection.

Profile module 650 contains information about the Internet Gateway, such as the device capabilities including processing capacity, storage capacity, display type (including the screen type, resolution and size), power capacity (when fully charged as well as the current power availability), link layers supported by the device and whether they are enabled and the types of applications it can handle. The profile module updates this information whenever a change takes place due to an upgrade, installation of new capabilities of software programs or a change in configuration. The information stored in this module is communicated to the service platform's device profile module 400 when a session is established between the Internet Gateway and the service platform.

Location information module 670 is responsible for sending the location information to the Location information module 200 that runs on the service platform. This module interfaces to a positioning system software implementation on the Internet Gateway or connected to it physically through a link layer. This module receives the information from the positioning system (e.g. GPS or Galileo) and sends it, along with topological information, to location information module 200 on the service platform 60. The topological information is gathered through interfacing to the Internet Gateway configuration information. The topological information can be gathered through the Dynamic Host Configuration Protocol (DHCP), or IPv6 Neighbor Discovery protocol, or manual configuration, or a combination of those mechanisms.

Application relay module 750 contains the application relay that communicates with the application module 800 residing on the service platform shown in FIG. 2. This module also communicates with the application module 620 that resides on the application device. When this module communicates with module 620 it first determines the type of application 620 and the format in which the data is sent from application 620 in the application device. This is done through the use of an application identifier communicated from module 620 to module 750, in addition to the format being used. In another embodiment of this invention, the data format can be predetermined based on a preconfigured association between the application identifier and the data format.

Upon determining the application identifier for module 620 and data format, module 750 communicates this information to application module 800 and policy module 700. The application module 800 residing on the service platform may command or request that the application relay module 800 on the Internet Gateway uses a different format that better suit the link conditions. This request/command may take place when a session is established or dynamically during an active session.

Security module 520 establishes a secure communication channel with the Internet Gateway through its interaction with security module 550 on the Internet Gateway. This module and module 550 could be implemented as part of the link layer function or as a separate application layer function. Security credentials may be preconfigured on both devices, dynamically exchanged, or rely on the user's input of a shared secret.

Application module 620 is responsible for collecting the data generated by the application device and sending it to the application relay module 750. This module is assigned an application identifier that indicates to the application relay module 750 the type of information being sent and the format in which it is sent.

The application identifier is initially sent from application module 620 to application relay module 750, which in turn uses it to identify the application type and data format. This information allows the application relay module 750 to request appropriate resources from the access network, in addition to negotiating the appropriate encoding mechanism with application module 800 on the service platform. The request can be sent in by different means, or alternatively, it can be sent by modifying the information in the application identifier. Hence, it is important that the application identifier can be used to either explicitly, or implicitly identify this information. Within one embodiment of this invention, the application identifier is used to explicitly indicate this information. Within another embodiment of this invention, the application identifier is used to implicitly indicate this information. Hence, two different formats can possibly be used for the application identifier. These formats can be encoded as a variable length token that can be adapted to store different types of information depending on whether it should be used in implicit or explicit mode. Both formats are discussed below.

An explicit identifier contains various information about the application in different fields. An explicit identifier can include application purpose, application vender, data encoding, data compression and Quality of Service (QoS) information. It should be recognized that other information can be used in addition to, or as an alternative to, the aforementioned information.

The application purpose field indicates the use of the application. For instance, an application may be used to measure an electro-cardiogram, heart rate, kidney functions, and so on. The application vendor field indicates the vendor of the application. Different vendors may have different formats for the data. The data encoding field indicates the data encoding scheme. For instance, the data may be sent in binary format, XML, and so on. The data compression field indicates the compression mechanism, if any, that is used to send the data. The QoS information field includes information about the traffic behavior sent by the application. This includes expected packet inter-arrival, delay tolerance, reliability requirements, and so on.

When operating in implicit application identification mode, the properties of all supported applications are preconfigured either in the Internet Gateway or the service platform. Hence, there is no need to send all the information listed in the explicit mode, in the application identifier. Therefore, the application identifier can include application purpose, application vendor and data encoding. It should be recognized that other information can be used in addition to, or as an alternative to, the aforementioned information.

The application purpose field indicates the use of the application. For instance, an application may be used to measure an electro-cardiogram, heart rate, kidney functions, and so on. The application vendor field indicates the vendor of the application. Different vendors may have different formats for the data. The data encoding field indicates the data encoding scheme, e.g., the data may be sent in binary format, XML, etc.

The present invention can employ a number of different techniques to discover the service platform. In many systems, the name or network address of the service platform will be preconfigured into the Internet Gateway. In other circumstances, the system may be required to use dynamic lookup operations such as Dynamic Host Configuration Protocol (DHCP) [RFC2131, RFC3315, RFC3736], the Domain Name System (DNS) [RFC1034, RFC1035], SRV Server lookup records (SRV) [RFC2052] among other mechanisms. In all cases, the Security module on the Internet Gateway identifies if the Service Platform indicated by lookup or preconfiguration matches its configured trust, before commencing application communication.

In an exemplary embodiment, the service platform may be preconfigured as a DNS name in the Internet Gateway, and the IP address resolved through name lookup (A or AAAA). This allows multiple servers to be associated with one name, and load distribution to occur amongst servers. Subsequent communications would continue to deal with only one of those servers, so long as communication was viable. This would allow for maintenance of the application context, without renegotiation or security association reestablishment. Analogous operation using other service discovery protocols is envisaged, where the name of a service platform or a service name is preconfigured and used as a starting point for contact with one or more servers.

Where service platform devices share application context for load balancing or redundancy, renegotiation of the context may not be required when moving to a different platform. It is necessary that security credentials are checked, either through renegotiation of session keys, or through in-band checks using the existing derived keys.

In another embodiment, where the network service provider is also the operator of the service platform, the service platform details may be passed to the gateway as part of its host configuration data, for example using DHCP (RFC2131, RFC3315, RFC3736). This information, being associated not only with the host, but also with the visited network, In situations where a host roams from its native service provider to another provider, service platform configuration information may be passed as part of the authorization data subsequent to roaming authentication procedures. Such policy may be passed from the originating service provider, through such mechanisms as RADIUS (RFC2168 etc). Information passed to the host may, at the policy of the native service provider, allow for the host to use the roaming service provider's own service platform. Such decisions may be encapsulated in a policy database, or sourced from policy engine 700 of the native service provider's service platform, or based on the user's profile 500 configured in the native service provider's platform.

The mechanisms whereby the roaming operator's service platform may be authorized include the compatibility of the service, security and identity protection measures or billing arrangements between roaming and native operators. It is also envisaged that the native service provider may wish to provide cryptographic authorization to the Internet Gateway to prove how the roaming provider's service platform is authorized to perform.

Where the discovery of the service platform is not tied to the access network infrastructure, such as with DNS, the service platform may not be tied to the visited network at all. Service platform 60 may receive network topological location information at its location information module 200 from the Internet Gateway. Where the policy engine 700 determines that the roaming service provider's Service platform should be used, it notifies the Internet Gateway of a more appropriate service platform. An example reason for such a policy decision is to reduce the round trip time between the gateway and serving service platform.

The applications which require management by an Internet Gateway may be of various types and sensitivities. Classes of these applications may be grouped together based on their characteristics, which are determined by application profiles stored in the gateway. A more explicit determination of application groupings can be achieved by communicating with the native service provider's policy module 700. In either of these cases it is possible that the serving service platform is different for various subsets of applications.

Where a different set of applications is serviced by different service platforms, it is envisaged that no communication as to the nature or presence of other applications would be made, except with the authorization of the native service platform. In this way, sensitive data such as patient health monitoring may be kept private and distinct, unless authorized by the native service platform, as described by its policy engine 700 or the user's profile 500. Serving service platforms may only be able to request additional information based on a token passed by the Internet Gateway during session establishment, and verifiable by the native service platform.

Figure 4:
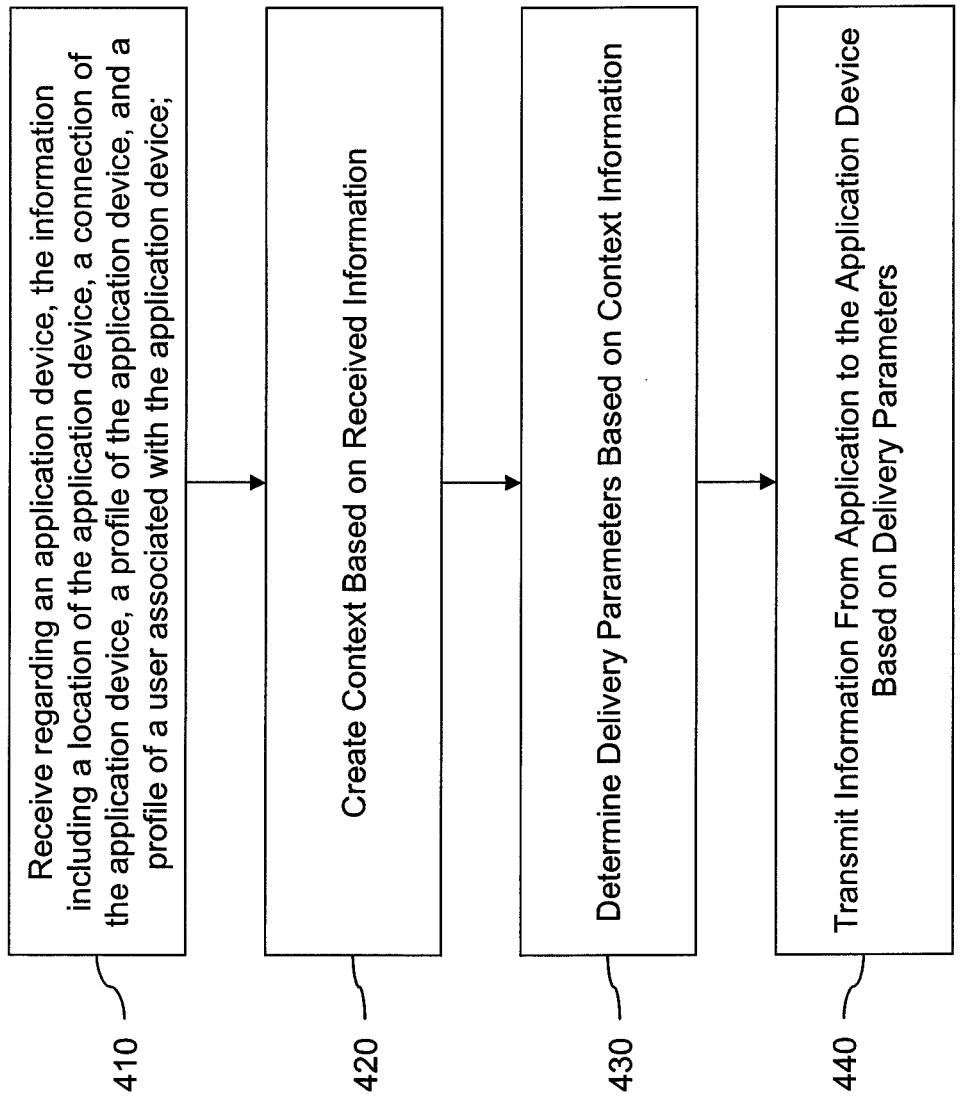
FIG. 4 is a flow diagram of an exemplary method in accordance with the present invention.

FIG. 4 is a flow diagram of an exemplary method in accordance with the present invention. Initially, modules 200-500 of service platform 60 receive information regarding an application device (step 410). This information can include any of the information discussed above, such as the location of the application device, a connection type of the application device, a profile of the application device, and a profile of a user associated with the application device. Modules 200-500 provide this information to policy engine 700, which creates a context based on the received information (step 420). Application 800 uses the context information to determine delivery parameters (step 430) and transmits information to the application device 10 based on the delivery parameters (step 440).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A service platform device, comprising:
a plurality of modules including a location module, user profile module, link state module and device profile module that receive and process information from an application device;
a policy engine that receives the processed information from the plurality of modules and generates a context for the application device; and
a plurality of telemedicine or wellness applications, each identified by a respective application identifier known by the service platform, the respective application identifier includes one or more fields for an application purpose, application vendor, data encoding, or Quality of Service (QoS) for the respective application, that employ the generated context to deliver services to the application device,
wherein the plurality of modules, policy engine and plurality of applications run on the service platform device,
wherein the link state module emulates an entire path between the application device and the service platform device as a single link and calculates at least one of path throughput, path goodput, or path variation parameters over a configurable period of time, wherein the path throughput is calculated based on round trip time for traffic between the application and the application device, the path goodput is calculated based on a throughput of valid packets between the service platform device and the remote device, and the path variation parameters accounts for movement or environmental effects of the entire path,
wherein the location module receives (1) geographical location information, information regarding a type of positioning system used to obtain the geographical location information, and information regarding tolerance of the geographical location information, or (2) a topological location,
wherein when the policy engine determines, based on the geographical location information or the topological location of the application device, that the application device is located in a visited network, the service platform notifies the application device of a service platform in the visited network, and the application device receives services from an application executing on the service platform in the visited network.

2. The service platform device of claim 1, wherein the device profile module receives information regarding the application device's processing capacity, storage capacity, display type, power capacity, link layers supported by the application device and types of applications that the application device supports.

3. The service platform device of claim 1, wherein the user profile module includes user information that is generic to all of the plurality of applications and user information specific to each of the plurality of applications.

4. The service platform device of claim 1, further comprising a security module that controls access to the plurality of applications by the application device.

5. The service platform device of claim 4, wherein the application device includes security credentials for authorizing the application device with the security module.

6. The service platform device of claim 5, wherein the security credentials are the same security credentials that are used for authorization with a wireless macro network.

7. The service platform device of claim 1, wherein the applications employ the context to select a particular data encoding, relevant content and estimated path quality.

8. The service platform device of claim 1, wherein the application device is coupled to the service platform device via a gateway device.

9. The service platform device of claim 8, wherein the gateway device is a wireless communication device.

10. The service platform device of claim 1, wherein the application device includes a gateway device.

11. The service platform device of claim 10, wherein the gateway device includes an application relay that receives information from the application device and optimizes the information for transmission to one of the applications of the service platform device.

12. The service platform device of claim 11, wherein the application relay receives the application identifier from the application device.

13. The service platform device of claim 10, wherein the gateway device discovers the service platform using domain name server (DNS) protocol or dynamic host configuration protocol (DHCP).

14. The service platform device of claim 1, wherein when the policy engine determines, based on a decision of the policy engine or a user profile, that the application device is located in a visited network, the service platform notifies the application device of a service platform in the visited network, and the application device receives services from an application executing on the service platform in the visited network.

15. A method of communicating information, the method comprising the acts of:
   receiving information regarding an application device, the information including a connection of the application device, a profile of the application device, a profile of a user associated with the application device, and at least one of (1) geographical location information, information regarding a type of positioning system used to obtain the geographical location information, and information regarding tolerance of the geographical location information, or (2) a topological location;
   emulating an entire path between the application device and a service platform as a single link and calculating at least one of path throughput, path goodput, or path variation parameters over a configurable period of time, wherein the path throughput is calculated based on round trip time for traffic between the application and the application device, the path goodput is calculated based on a throughput of valid packets between the service platform and the remote device, and the path variation parameters accounts for movement or environmental effects of the entire path;
   creating a context based on the received information;
   determining delivery parameters based on the context information;
   transmitting information from an application to the application device based on the delivery parameters; and
   determining, based on the geographical location information or the topological location of the application device, that the application device is located in a visited network, the service platform notifies the application device of a service platform in the visited network, and the application device receives services from an application executing on the service platform in the visited network,
   wherein the application is one of a plurality of telemedicine or wellness applications each identified by a respective application identifier known by the service platform, the respective application identifier includes one or more fields for an application purpose, application vendor, data encoding, or Quality of Service (QoS) for the respective application, each of the plurality of applications employing the generated context to delivery services to the application device.

16. The method of claim 15, further comprising:
   receiving information regarding a second application device, the information including a location of the second application device, a connection of the second application device, a profile of the second application device, and a profile of a user associated with the second application device;
   creating a context based on the received information of the second application device; and
   determining delivery parameters based on the context information; and
   transmitting information from an application to the second application device based on the delivery parameters.

17. The method of claim 15, wherein the application device is coupled to the application via a gateway device.

18. The method of claim 17, wherein the gateway device is a wireless communication device.

19. The method of claim 15, wherein the application device includes a gateway device.

* * * * *